United States Patent [19]
Kolterman et al.

[11] Patent Number: 5,809,935
[45] Date of Patent: Sep. 22, 1998

[54] PORTABLE DRINK DISPENSER

[76] Inventors: Thomas E. Kolterman; Susan Donahue, both of 216 Cassandra Dr., Chalfont, Pa. 18914

[21] Appl. No.: 855,832

[22] Filed: May 12, 1997

[51] Int. Cl.⁶ ...................................................... A01K 7/00
[52] U.S. Cl. ................................................................ 119/74
[58] Field of Search ................................... 119/74, 51.01, 119/51.03, 71, 650, 72, 651, 602; 222/212; 220/4.26, 4.27, 501, 705, 707, 717

[56] References Cited

U.S. PATENT DOCUMENTS

| D. 248,448 | 7/1978 | McClure et al. | D9/10 |
|---|---|---|---|
| 2,203,476 | 6/1940 | Trabold | 220/717 |
| 2,533,643 | 12/1950 | Verner | 119/71 |
| 3,910,618 | 10/1975 | Massenz | 294/1 |
| 3,921,860 | 11/1975 | Zackheim | 222/207 |
| 4,183,328 | 1/1980 | Lawrence | 119/156 |
| 4,192,256 | 3/1980 | Clugston | 119/51.5 |
| 4,463,706 | 8/1984 | Meister et al. | 119/51 R |
| 5,462,556 | 10/1995 | Powers | 119/651 |
| 5,472,120 | 12/1995 | Stebick et al. | 222/153.6 |
| 5,632,407 | 5/1997 | Christensen | 220/717 |

*Primary Examiner*—Thomas Price
*Attorney, Agent, or Firm*—Joseph W. Molasky & Associates

[57] ABSTRACT

A portable drink dispenser, particularly suited for watering animals while traveling, is disclosed. The dispenser includes a flexible bottle-like container for holding the liquid, such as water. The container includes an upwardly protruding neck opening. A drinking dish, or bowl, includes an opening in its bottom surface and is positioned over the container such that the container's neck opening protrudes into the drinking bowl. A "push-pull" cap having a first, closed position and a second, opened position is positioned within the drinking bowl and attached to the neck opening of the container. A tube (i.e., a "straw") is attached to the underside of the cap and extends downward, through the neck opening toward the bottom of the container. The neck and the cap may include threaded surfaces for ease of attachment. A first sealing ring may be disposed between the drinking bowl and the cap, and a second ring between the container and the drinking bowl to increase the "watertightness" of the fit between the bowl and the container. When the cap is in the "open" position, the container may be squeezed such that the liquid will travel through the tube and enter the drinking bowl. So long as pressure is applied to the container, liquid will continue to enter the bowl. When the cap is in the "closed" position, no liquid will enter the bowl, even when the container is squeezed. Advantageously, when the flexible container and the drinking bowl are formed as separate piece parts, the bowl may be inverted and attached to the container to allow for the dispenser to be more compact for storage.

28 Claims, 4 Drawing Sheets

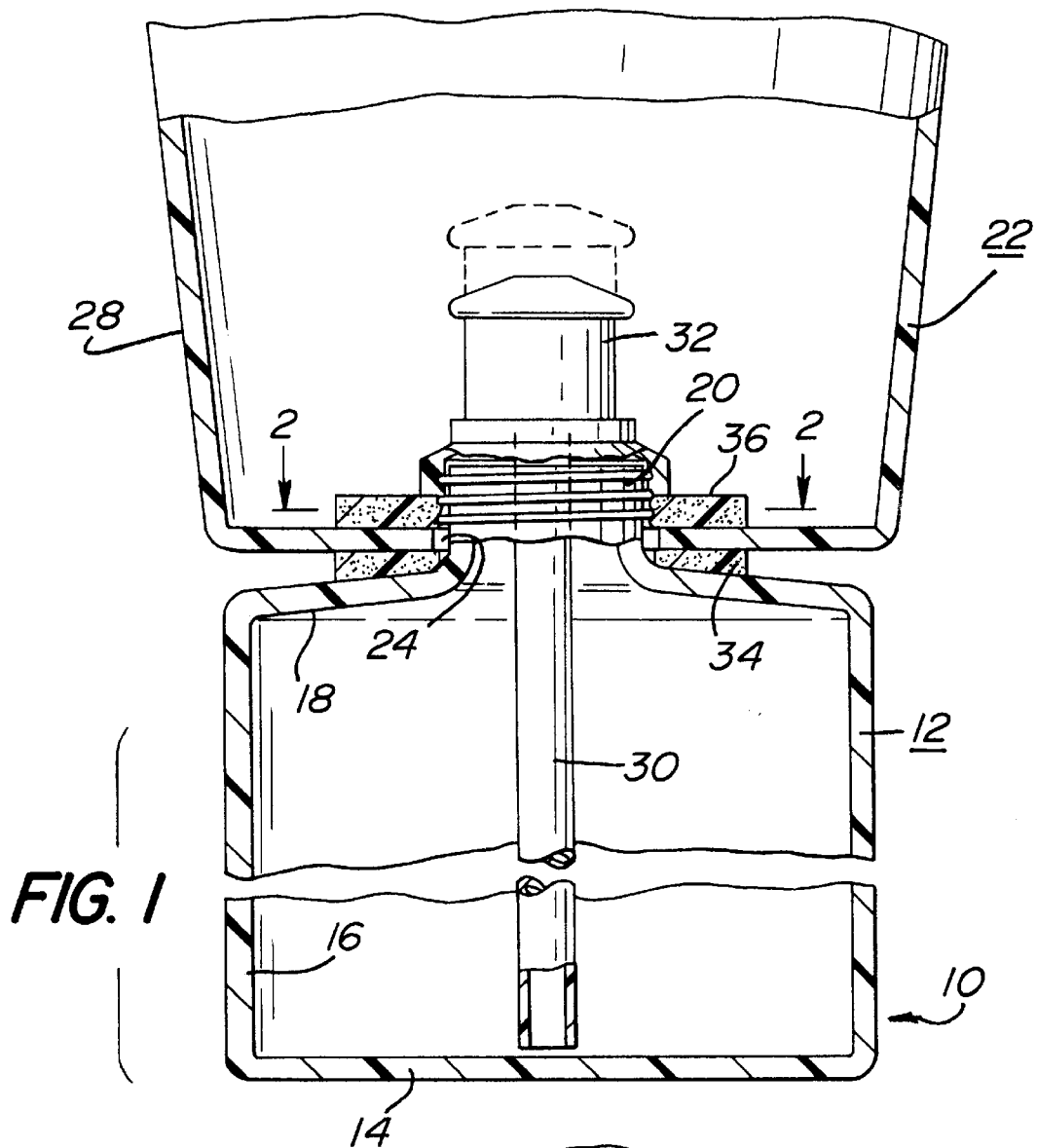
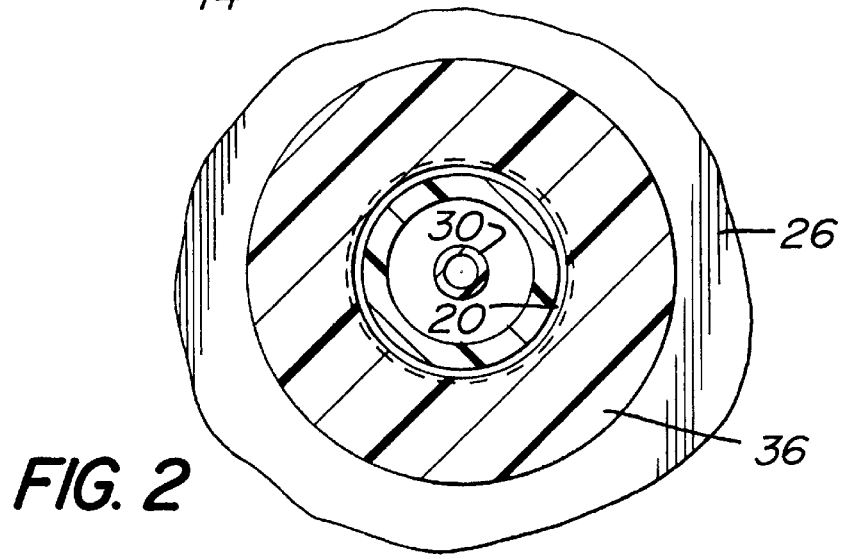

FIG. 5
FIG. 4
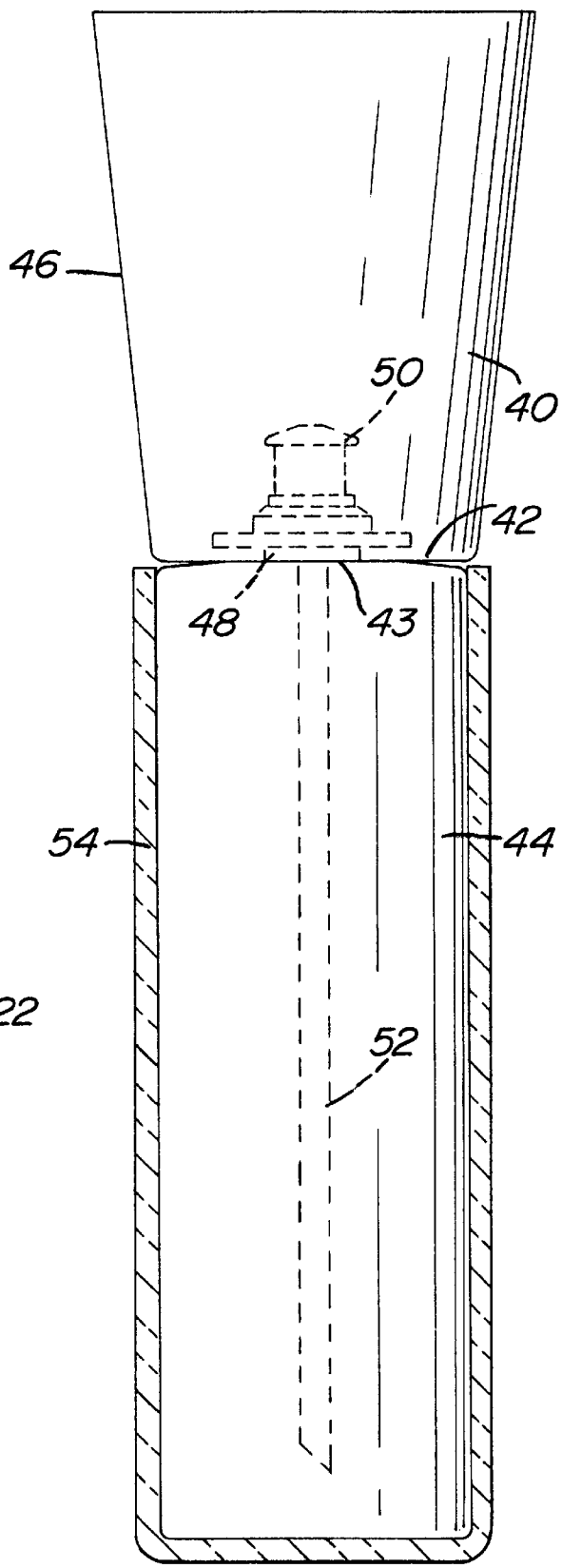
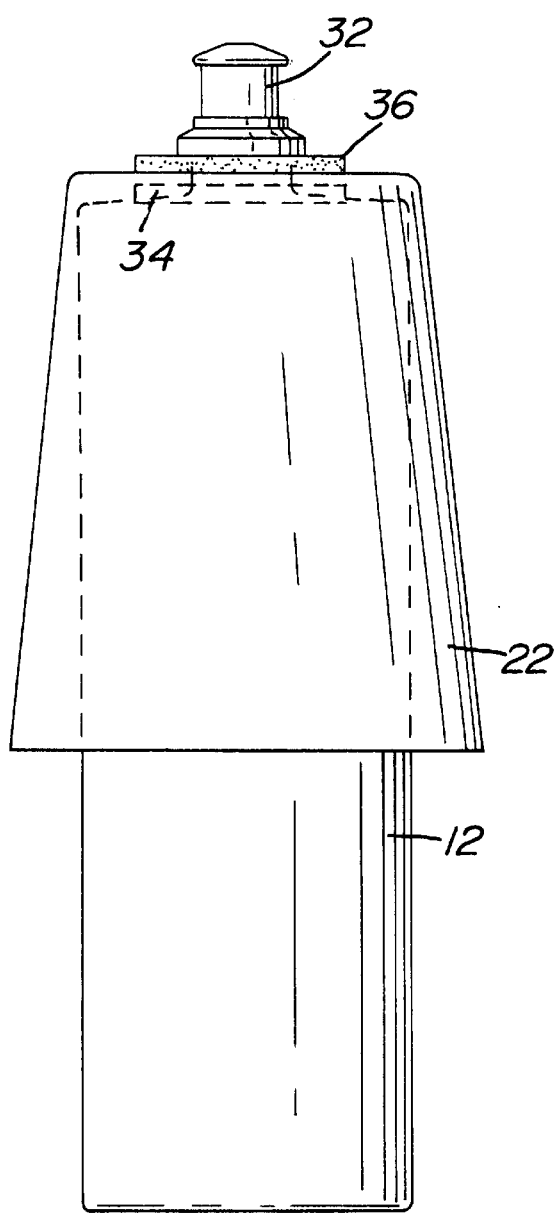

PORTABLE DRINK DISPENSER

BACKGROUND OF THE INVENTION

1. Field of the Invention

The present invention relates to a portable drink dispenser and, more particularly, to a portable drink dispenser, useful as a watering dish for animals, including a flexible container for holding the liquid and an upper drinking bowl attached to the container, the container including a "push-pull" cap to allow for the easy dispensing of water into the bowl, while also preventing the inadvertent dispensing of water into the drinking bowl.

2. Description of the Prior Art

Often times, when traveling with an animal, it is necessary to provide water to the animal. When in a car, recreational vehicle, or other means of transportation, in may be inconvenient to stop, find water, and give the animal a drink. Additionally, when in a remote location, it may be difficult to find water and, when camping, water directly from a stream or river may not be potable. As can be appreciated, merely filling a dish with water is not a preferred arrangement to use when in motion, since the water may spill. Additionally, it may be difficult to find and fill a water dish while a car is moving.

One prior art arrangement related to a portable drinking bowl for animals is disclosed in U.S. Pat. No. 4,192,256 issued to G.D. Clugston on Mar. 11, 1980. The Clugston arrangement relates to a combined feeding and watering device including an integral container for carrying water. As disclosed, the device is formed to include an exterior "water dish" on one sidewall of the container. The container itself is filled with water and includes a plugged opening between the container and the bowl. When it is desired to give the animal a drink, the plug is removed and the container is positioned such that the water will flow into the bowl. Once the animal has finished drinking, the container is tilted on its side and the plug returned to the opening. Although this arrangement is preferable to merely filling a bowl, it may be relatively bulky and heavy (especially when full), and requires a relatively flat and large location upon which to set the container while the animal is drinking. While this may be suitable for some purposes (such as camping, for example) it may not be particularly useful in a car or other moving vehicle, where space is usually at a premium.

Therefore, a need remains in the prior art for a portable device for watering animals that is easier to use while traveling than that available in the prior art.

SUMMARY OF THE INVENTION

The need remaining in the prior art is addressed by the present invention which relates to a portable drink dispenser and, more particularly, to a portable drink dispenser, useful as a watering dish for animals, including a flexible container for holding the liquid and an upper drinking bowl attached to the container, the container including a "push-pull" cap to allow for the easy dispensing of water into the bowl, while preventing the inadvertent dispensing of water into the drinking bowl.

In accordance with a preferred embodiment of the present invention, a flexible container is used which includes a "push-pull" cap (similar to those found on portable containers of bottled water) and tubing attached to the cap and extending downward from the cap toward the bottom of the container. A drinking bowl is attached to the container, where the bowl includes an aperture formed in its bottom surface such that an upper neck portion of the container protrudes through the aperture and into the drinking bowl. The "push-pull" cap, with the attached tubing, is then attached to the neck portion of the container. In one arrangement, the "push-pull" cap has an inner threaded surface which mates with an outer threaded surface formed on the neck of the flexible container. To assemble the drink dispenser, the drinking bowl is placed over the outer threaded neck of the flexible container and the cap (with the attached tubing) is thereafter screwed into place over the neck of the container. When it is necessary to provide a drink, the "push-pull" cap is lifted into its "open" position and the container squeezed to allow water to enter the drinking bowl. As long as pressure is applied to the container, water will remain in the bowl. Once the drink is finished, the cap is pushed down into its "closed" position and any water remaining in the drinking bowl may be discarded.

It is an advantage of this particular structure of the present invention that it may be reconfigured into a more compact form when not in use. In particular, the drinking bowl may be inserted "upside down" over the outer threaded neck of the container (i.e., such that the opening of the bowl is extending downward toward the bottom of the container), then the "push-pull" cap screwed in place such that the cap now attaches the floor of the drinking bowl to the top surface of the container. Additionally, an insulated sleeve, also formed of a flexible material, may be used to surround the container and assist in maintaining the temperature of the contained liquid (either cold or hot, as the case may be).

It is an aspect of the present invention that a pair of sealing rings may be used with the structure defined above to provide for an essentially "watertight" seal between the container and the bowl. In particular, a first sealing ring may be positioned over the outer threaded neck of the flexible container so as to rest against the top surface of the container. The drinking bowl is then positioned over this first sealing ring. A second sealing ring may then be placed within the drinking bowl so as to surround the protruding outer threaded neck member. The "push-pull" cap is then screwed down over the second sealing ring so as to compress both rings and form the watertight seal. Alternatively, only a single sealing ring, placed between the bowl and the "push-pull" cap (the "second" sealing ring from above) may be used and still provide an acceptable degree of sealing between the container and the drinking bowl.

In an alternative embodiment of the present invention, the combination of the container and drinking bowl may be formed as a unitary member (using injection or compression molding techniques, for example). In this embodiment, a "neck" portion is still formed in the base of the drinking bowl so as to extend upward from the base such that a cap may be attached thereto. It is an advantage of the unitary design that the need for sealing rings is eliminated, since there is no longer any separation between the flexible container and the drinking bowl. It is be understood, however, that the nature of the unitary design—while eliminating the need for sealing rings—also eliminates the ability to "reconfigure" the dispenser into a compact, traveling arrangement described above.

Although the arrangement as described is useful for feeding pets, there exist other uses (for example, for giving drinks to small children when traveling) that also fall within the spirit and scope of the present invention. Indeed, various other features and uses will become evident during the course of the following discussion and by reference to the accompanying drawings.

BRIEF DESCRIPTION OF THE DRAWINGS

Referring now to the drawings, where like numerals represent like parts in several views:

FIG. 1 contains a cut-away side view of an exemplary portable drink dispenser formed in accordance with the teachings of the present invention;

FIG. 2 is a top view of the arrangement of FIG. 1, taken along line 2—2 so as to particularly illustrate the placement of the sealing rings in this embodiment of the present invention;

FIG. 4 illustrates the "storing" configuration of an exemplary portable drink dispenser formed in accordance with the teaching of the present invention;

FIG. 5 is a side view of an alternative embodiment of the present invention including a narrower drinking cup and a single sealing ring.

DETAILED DESCRIPTION OF THE PREFERRED EMBODIMENTS

Figure 3:
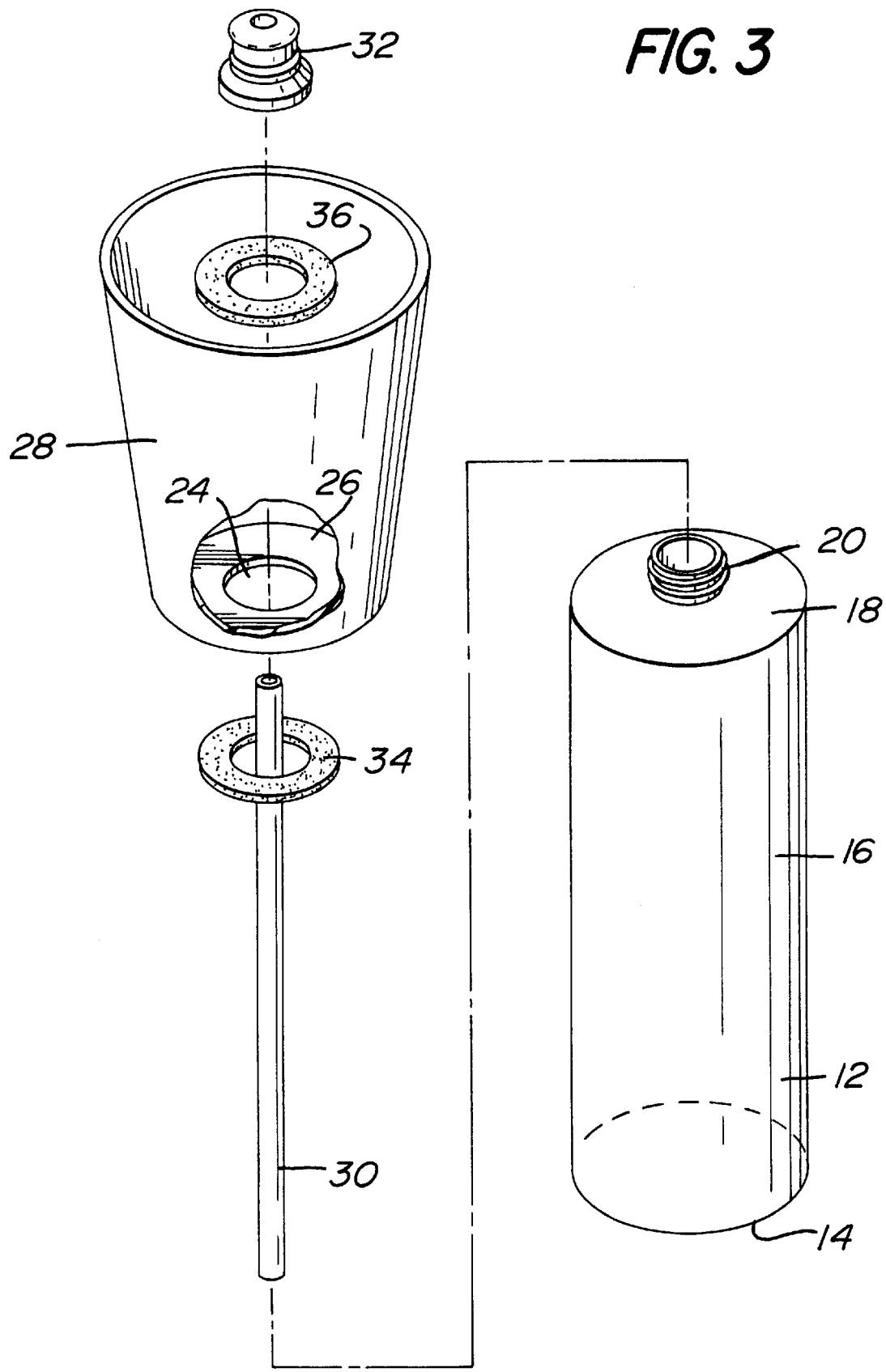
FIG. 3 is an exploded view of the various piece parts required to form one particular embodiment of the present invention.

FIG. 1 illustrates an exemplary portable drink dispenser 10 formed in accordance with the present invention. As shown, drink dispenser 10 includes a flexible container 12 for holding water, or any other liquid. Container 12 may be formed of any suitable flexible material, for example plastics such as low density or medium density materials (e.g., polyethylene). Container 12 is formed to include a relatively planar bottom surface 14 and an essentially cylindrical sidewall 16. A top surface 18 of container 12 includes a central opening, as defined by an outer threaded neck portion 20. In general, the configuration of container 12 may be similar to those commonly used to contain bottled drinking water. A drinking bowl 22, as shown in FIG. 1, is positioned over container 12 such that outer threaded neck portion 20 of container 12 protrudes through an opening 24 in the bottom surface 26 of bowl 22. Bowl 22 further includes sidewalls 28, where sidewalls 28 may be outwardly curving, tapered or scooped shaped, as desired, to form the requisite shape of a drinking bowl. For the embodiment as illustrated in FIG. 1, drinking bowl 22 is formed to have a configuration useful for situations where the dispenser is used to provide water to animals. Drinking bowl 22 may also be formed of a plastic material, for example a medium or high density plastic, although any suitable material may be used.

A "push-pull" cap 32, including an inner threaded surface, is then mated with outer threaded neck portion 20 of container 12. "Push-pull" cap 32 has two working positions, a first "closed" position, as illustrated in FIG. 1, and a second "opened" position, as illustrated in phantom in FIG. 1. A tubing member 30 is attached to the underside of cap 32 and extends downward toward the floor of container 12, as shown in FIG. 1. When "push-pull" cap 32 is closed, no water (or other liquid) is able to enter bowl 22.

When it is desired to give an animal (for example) a drink, "push-pull" cap 32 is pulled into its "opened" position. Then, container 12 may be squeezed such that some liquid will enter tubing 30, exit through the top of cap 32 and begin to fill bowl 22. The amount of liquid that enters bowl 22 is thus controlled by the force applied to container 12. When a sufficient amount of liquid has entered bowl 22, cap 32 may be closed. Alternatively, "push-pull" cap 32 may be left open for as long as the animal drinks, and only closed once the animal is done. Once the animal is finished drinking, any liquid remaining in bowl 22 may then be discarded and cap 32 returned to its closed position.

To further enhance the degree of containment of liquid within the arrangement as described thus far, a pair of sealing rings (or alternatively, a single sealing ring) may be added to the dispenser assembly. Referring to FIG. 1, a first sealing ring 34 is illustrated as being positioned over outer threaded neck portion 20 of container 12 so as to contact top surface 18 of container 12. First sealing ring 34 is formed to include an aperture slightly greater than the diameter of neck portion 20. A second sealing ring 36 is shown in FIG. 1 as being located between drinking bowl 22 and "push-pull" cap 32. In particular, second sealing ring is positioned over neck portion 20 so as to contact the inner bottom surface 26 of bowl 22. Therefore, when cap 32 is screwed into place over neck portion 20, the torque applied to the connection will compress first and second sealing rings 34,36, resulting in an essentially "leak-proof" connection between container 12 and drinking bowl 22. First and second sealing rings 34,36 may be formed of any suitable compressible material, including but not limited to, rubber (such as neoprene) or cross-linked polyethylene. In an alternative embodiment as discussed below in association with FIG. 5, a single sealing ring may be disposed between the drinking bowl and the "push-pull" cap so as to provide an improved degree of "tightness", albeit not as "leak-proof" as using a pair of such sealing rings.

A top, cut-away view of FIG. 1, taken along line 2—2, is illustrated in FIG. 2. Evident in this view is second sealing ring 36 as it is positioned over bottom surface 26 of bowl 22. Also shown in this view is a cut-away section of outer threaded neck portion 20 of container 12, as well as the top opening of tube 30 within "push-pull" cap 32.

FIG. 3 contains an exploded isometric view of the exemplary embodiment of the present invention described above in association with FIG. 1. In particular, first sealing ring 34 is placed over neck portion 20 to contact top surface 18 of flexible container 12, where the opening within sealing ring 34 must be slightly larger than the outer diameter of neck portion 20. The diameter of sealing ring 34 itself should be wide enough so as to result in creating a relatively "water-tight" seal between bowl 22 and container 12. Referring back to FIG. 3, drinking bowl 22 is then inserted over neck portion 20 via the opening 24 formed in the bottom surface 26 of bowl 22. The diameter of opening 24 is required to be greater than the outer diameter of neck portion 20. Second sealing ring 36 is then positioned over neck portion 20 so as to be contiguous with the inner bottom surface 26 of drinking bowl 22. Tube 30 is then attached to the underside of "push-pull" cap 32 and inserted through the opening at neck portion 20 of container and cap 32 is screwed into place over neck portion 20 with a force sufficient to compress sealing rings 34 and 36.

As mentioned above, an advantage of this particular embodiment of the present invention is that it may be reconfigured into a more compact design when not being used. FIG. 4 illustrates this more compact arrangement. To re-assemble into its "packing" configuration, drinking bowl 22 is inserted over container 12 in an inverted position, that is, with the inner surface 26 of bowl 22 contacting first sealing ring 34 and/or top surface 18 of container 12. Simply stated, the bowl is inverted so that the open top surface extends downward toward the bottom of the container. Since any drinking bowl will have outwardly extending sidewalls, the bowl may be inverted and placed over container 12 without becoming blocked by sidewalls 16 of container 12. As with the "drinking" position of the dispenser, "push-pull" cap 32 is attached to neck portion 20 of container 12, in this case to hold drinking bowl 22 it is "packing" position.

FIG. 5 contains a side view of an alternative arrangement of the present invention that may be useful for giving drinks to small children or others. As shown, this arrangement includes a cup 40 which may be slightly larger and not as "bowl-shaped" as drinking bowl 22 of the previous embodiment. In particular, cup 40 may include a relatively flat bottom surface 42 with an opening 43 for insertion of a container 44, and relatively narrowly tapered sidewalls 46. As also shown in FIG. 5, this particular embodiment utilizes only a single sealing ring 48, where sealing ring 48 is disposed between cup 40 and a "push-pull" cap 50. Although not quite as "leak-proof" as an embodiment using a pair of sealing rings, the utilization of at least one sealing ring does enhance the degree of "watertightness" achieved between the cup and the container. The arrangement of FIG. 5 functions in a manner similar to that described above. That is, when it is desired to give someone a drink, "push-pull" cap 50 is pulled into its "opened" position and container 44 is squeezed so as to allow for a quantity of liquid to pass through tubing 52 and enter drinking cup 40. When cup 40 has been sufficiently filled, cap 50 is closed. Advantageously, the arrangement of FIG. 5 may allow for a number of people to "share" the same container, with each person using a different drinking cup, since it is relatively easy to remove and replace the drinking cup. Also illustrated in FIG. 5 is an insulating jacket 54 that may be disposed to encase container 44 and keep the liquid therein either "cold" or "hot", as the case may be.

Figure 6:
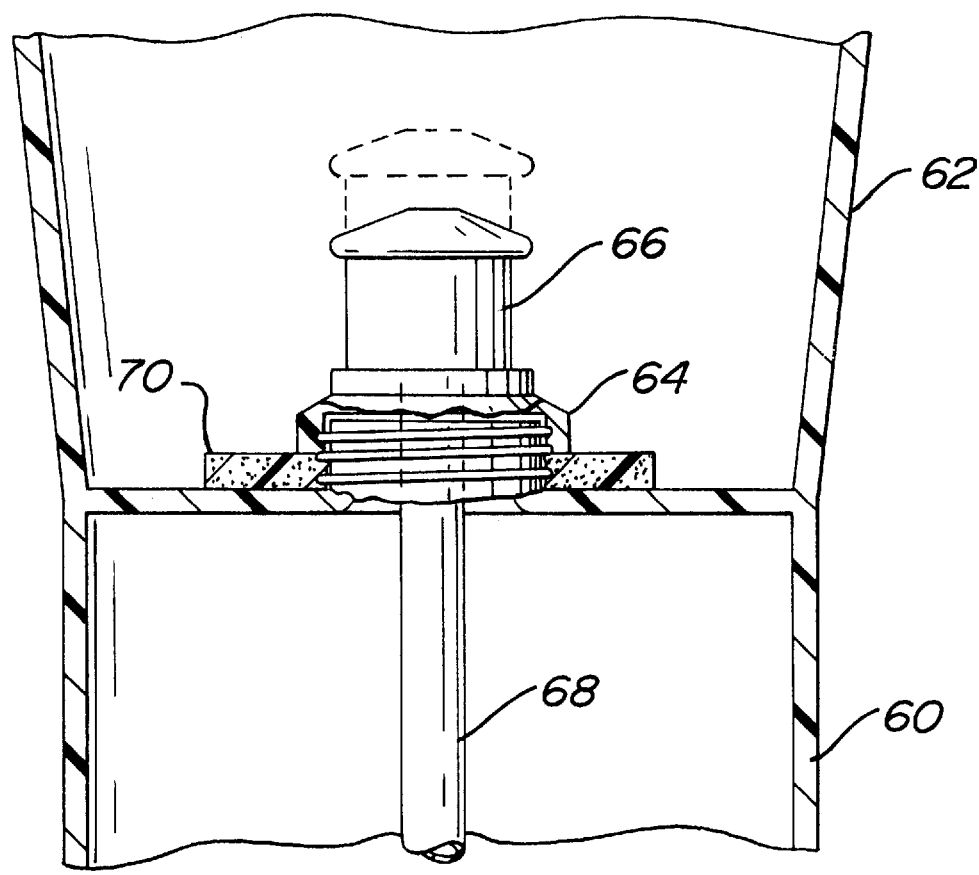
FIG. 6 is an isometric view of an alternative embodiment of the present invention wherein the container and drinking bowl are formed as a single unit.

FIG. 6 contains an isometric view of an alternative embodiment of the drink dispenser of the present invention. In particular, the configuration as illustration in FIG. 6 is a unitary design, that is, container 60 and drinking bowl 62 are formed as a single piece. Various techniques exist in the art for creating such a unitary design, including but not limited to, injection molding or compression molding. As formed, the dispenser includes an upwardly extending neck portion 64 so that a "push-pull" cap 66 and associated tubing 68 may be attached to the dispenser in a manner similar to that described above. If desired, a sealing ring 70 may be disposed underneath cap 66 to surround neck portion 64. When formed as a unitary structure, the container/bowl should be formed from a material that is sufficiently flexible so as to allow for the sides of the container to be compressed, while also being sufficiently rigid such that an animal can drink from the bowl portion. A medium density plastic material is considered as an exemplary material sufficient for both purposes. As mentioned above, an advantage of the unitary arrangement of the present invention is the elimination of the need for sealing rings, since there is no physical separation between the components forming the container and the bowl.

Various other alternatives to the design and configuration of the present invention will be apparent to those skilled in the art and are considered to fall within the scope of the present invention. For example, various materials may be used to form the different components of the portable drink dispenser. Additionally, means for connecting the "push-pull" cap to the container other than a mated threading arrangement may be utilized and fall within the scope of the present invention.

What is claimed is:

1. A portable drink dispenser comprising:
    a flexible container including a bottom wall and sidewalls, said flexible container further comprising a top wall including a centered opening therein and an upwardly protruding neck portion disposed to surround said centered opening;
    a drinking bowl including sidewalls and a bottom wall, said bottom wall including a centered opening so that said drinking bowl may be positioned over said protruding neck portion of said flexible container such that said neck portion protrudes into the inner region of said drinking bowl;
    a cap member disposed within said drinking bowl so as to connect with said protruding neck portion of said container, wherein said cap member includes a first, closed position and a second, opened position; and
    a tube including a first end attached to the underside of said cap member, said tube positioned through said centered opening of said flexible container such that a second, opposing end of said tube is in proximity with said bottom wall of said container and liquid within said container may travel through said tube and enter said drinking bowl when said container is squeezed and said cap member is in the second, opened position.

2. A portable drink dispenser as defined in claim 1 wherein the upwardly protruding neck portion includes an outer threaded surface and the cap member includes an inner threaded surface such that said cap member may be screwed onto said neck portion.

3. A portable drink dispenser as defined in claim 2 wherein the dispenser further comprises a sealing ring disposed between the drinking bowl and the cap member, wherein said sealing ring will compress when said cap member is screwed onto the neck portion of the container.

4. A portable drink dispenser as defined in claim 3 wherein the dispenser further comprises a second sealing ring, said second sealing ring being disposed between the flexible container and the drinking bowl, wherein said second sealing ring will compress when said cap member is screwed onto the neck portion of said flexible container.

5. A portable drink dispenser as defined in claim 3 wherein a sealing ring comprises a compressive material.

6. A portable drink dispenser as defined in claim 4 wherein the first and second sealing rings comprise a compressive material.

7. A portable drink dispenser as defined in claim 5 wherein the compressive material comprises a rubber material.

8. A portable drink dispenser as defined in claim 7 wherein the rubber material comprises neoprene.

9. A portable drink dispenser as defined in claim 5 wherein the compressive material comprises cross-linked polyethylene.

10. A portable drink dispenser as defined in claim 1 wherein the dispenser further comprises a sealing ring disposed between the drinking bowl and the cap member, wherein said sealing ring will compress when said cap member is connected to the neck portion of said flexible container.

11. A portable drink dispenser as defined in claim 10 wherein the dispenser further comprises a second sealing ring, said second sealing ring being disposed between the flexible container and the drinking bowl, wherein said second sealing ring will compress when the cap member is connected to the neck portion of said flexible container.

12. A portable drink dispenser as defined in claim 10 wherein a sealing ring comprises a compressive material.

13. A portable drink dispenser as defined in claim 11 wherein the first and second sealing rings comprise a compressive material.

14. A portable drink dispenser as defined in claim 12 wherein the compressive material comprises a rubber material.

15. A portable drink dispenser as defined in claim 14 wherein the rubber material comprises neoprene.

16. A portable drink dispenser as defined in claim 12 wherein the compressive material comprises cross-linked polyethylene.

17. A portable drink dispenser as defined in claim 1 wherein the drinking bowl and the flexible container are formed as separate piece parts and said drinking bowl is attached to said container in a first, drinking position, with the open top area of said drinking bowl extending upward away from said container.

18. A portable drink dispenser as defined in claim 1 wherein the drinking bowl and the flexible container are formed as separate piece parts and said drinking bowl is attached to said container in a second, storage position, with the open top area of said drinking bowl extending downward so as to surround the sidewall of said container.

19. A portable drink dispenser as defined in claim 1 wherein the drinking bowl and the flexible container are formed as a single, unitary piece part.

20. A portable drink dispenser as defined in claim 1 wherein the drinking bowl comprises a relatively shallow and wide bowl configuration, suitable for allowing animals to drink therefrom.

21. A portable drink dispenser as defined in claim 1 wherein the drinking bowl comprises a relatively narrow and tall cup configuration, suitable for allowing people to drink therefrom.

22. A portable drink dispenser as defined in claim 1 wherein the flexible container and the drinking cup are formed of plastic materials.

23. A portable drink dispenser as defined in claim 22 wherein the flexible container is formed of a relatively low or medium density plastic material and the drinking cup is formed of a relatively medium or high density plastic material.

24. A portable drink dispenser as defined in claim 23 wherein the flexible container and drinking bowl are formed of polyethylene.

25. A portable drink dispenser as defined in claim 1 wherein the dispenser further includes an insulating sleeve disposed to surround the flexible container, said insulating sleeve being of a flexible material.

26. A portable watering dish for animals, said portable watering dish comprising a flexible container including a bottom wall and sidewalls, said flexible container further comprising a top wall including a centered opening therein and an upwardly protruding outwardly threaded neck portion disposed to surround said centered opening;

a drinking bowl including outwardly sloping, curved sidewalls and a bottom wall, said bottom wall including a centered opening so that said drinking bowl may be positioned over said threaded neck portion of said flexible container in a manner whereby said threaded neck portion protrudes into the inner region of said drinking bowl;

a "push-pull" cap member including an inner threaded surface and disposed within said drinking bowl so as to mate with said the outer threaded surface of said protruding neck portion of said container, wherein said cap member includes a first, closed position and a second, opened position; and a tube attached at a first end to said "push-pull" cap member and positioned through said centered opening of said flexible container in a manner whereby a second, opposing end of said tube is in proximity with said bottom wall of said container, where any liquid within said flexible container may travel through said tube and enter said drinking bowl only when the container is squeezed and said "push-pull" cap member is in the second, opened position.

27. A portable watering dish as defined in claim 26 wherein the portable dish further comprises a first sealing member disposed between the drinking bowl and the "push-pull" cap member.

28. A portable watering dish as defined in claim 27 wherein the portable dish further comprises a second sealing member disposed between the flexible container and the drinking bowl.

* * * * *